(12) United States Patent
Albert et al.

(10) Patent No.: US 7,782,804 B2
(45) Date of Patent: Aug. 24, 2010

(54) REMOTE WIRELESS ACTIVATION AND COMMUNICATION

(75) Inventors: David A. Albert, Columbia, MD (US); John V. Martinez, Roswell, GA (US)

(73) Assignee: Axiometric, LLC, Columbia, MD (US)

( * ) Notice: Subject to any disclaimer, the term of this patent is extended or adjusted under 35 U.S.C. 154(b) by 69 days.

(21) Appl. No.: 12/399,621

(22) Filed: Mar. 6, 2009

(65) Prior Publication Data

US 2009/0225811 A1 Sep. 10, 2009

Related U.S. Application Data (60) Provisional application No. 61/035,093, filed on Mar. 10, 2008.

(51) Int. Cl.
*H04L 7/005* (2006.01)
(52) U.S. Cl. .......................................... 370/278; 370/80
(58) Field of Classification Search ................. 370/433, 370/254, 331, 241, 336, 330, 335; 455/67, 455/277
See application file for complete search history.

(56) References Cited

U.S. PATENT DOCUMENTS

| | | | | |
|---|---|---|---|---|
| 5,535,207 A | * | 7/1996 | Dupont | 370/433 |
| 5,666,653 A | * | 9/1997 | Ahl | 370/330 |
| 5,729,540 A | * | 3/1998 | Wegrzyn | 370/336 |
| 5,896,561 A | * | 4/1999 | Schrader et al. | 455/67.11 |
| 6,584,086 B1 | * | 6/2003 | Shim et al. | 370/335 |
| 7,145,890 B1 | * | 12/2006 | Seo et al. | 370/331 |
| 7,321,788 B2 | | 1/2008 | Addy et al. | |
| 7,426,190 B2 | * | 9/2008 | Manjeshwar et al. | 370/254 |
| 2006/0239333 A1 | | 10/2006 | Albert et al. | |
| 2008/0318541 A1 | * | 12/2008 | Kimoto | 455/277.1 |
| 2009/0122709 A1 | * | 5/2009 | Voglewede et al. | 370/241 |

\* cited by examiner

*Primary Examiner*—Thong H Vu
(74) *Attorney, Agent, or Firm*—Rahman LLC (57) ABSTRACT

A system and method of wireless communication. An activator comprises a first radio that transmits an activation message; a first microprocessor; a first memory component; and a first timer. A remote device comprises a second radio that periodically enters into an activation period of operation and a de-activation period of operation in order to conserve power; a second microprocessor; a second memory component; and a second timer. The first radio transmits the activation message repeatedly and continuously for a period at least equal to the sum of the activation period of operation and the de-activation period of operation of the second radio. At least one complete activation message is transmitted by the activator during every period of time allotted for activation of the second radio. The second radio increases a frequency of activation of the second radio upon receipt of a designated activation message from the first radio.

31 Claims, 5 Drawing Sheets

REMOTE WIRELESS ACTIVATION AND COMMUNICATION

CROSS-REFERENCE TO RELATED APPLICATION

This application claims the benefit of U.S. Provisional Patent Application No. 61/035,093 filed on Mar. 10, 2008, the contents of which, in its entirety, is herein incorporated by reference.

BACKGROUND

1. Technical Field

The embodiments herein generally relate to wireless communication, and, more particularly, to remote activation of and communication with power-limited devices using radio frequency (RF) signals.

2. Description of the Related Art

Remote communication has fast become a preferred method of interaction between two devices; e.g., an activator device and a remote device(s). For example, a service provider will typically transmit data to a customer's device that is located remotely from the service provider's location. Such transmission of data occurs over widespread communication channels thereby making remote communication the most cost-effective and realistic form of communication between the devices. In some instances the means of communication is wireless. Power supply for the activator device is generally controlled by the service provider and is easily accessible. However, power supply at the remote device(s) may not always be consistent or easily accessible, and may be limited. Nonetheless, remote communication from the activator device to the remote device(s) is still the preferred method of transmitting/receiving data between the devices.

SUMMARY

In view of the foregoing, an embodiment herein provides a communications system and a method of wireless communication comprising an activator device comprising a first radio device that transmits an activation message; a first microprocessor operatively connected to the first radio device; a first memory component operatively connected to the microprocessor; and a first timer operatively connected to the microprocessor. The communications system further comprises a remote device comprising a second radio device that periodically enters into an activation period of operation and a de-activation period of operation in order to conserve power; a second microprocessor operatively connected to the second radio device; a second memory component operatively connected to the microprocessor; and a second timer operatively connected to the microprocessor, wherein the first radio device transmits the activation message repeatedly and continuously for a period at least equal to the sum of the activation period of operation and the de-activation period of operation of the second radio device, wherein at least one complete activation message is transmitted by the activator device during every period of time allotted for activation of the second radio device, and wherein the second radio device increases a frequency of activation of the second radio device upon receipt of a designated activation message from the first radio device.

The activator device may transmit the activation message on each of a plurality of radio frequencies in a pseudo-random pattern such that with N frequencies used, at least (N+1) complete messages are transmitted in the time allotted for activation of the second radio device. Moreover, the second radio device may be periodically tuned to a different frequency. Additionally, the second radio device may extend the activation period of operation upon receipt of the designated activation message, wherein the second radio device may enter the de-activation period of operation if an additional designated activation message is not received within the extended activation period, and wherein the second radio device may enter an active state of operation following N successive periods of receipt of designated messages and the extended activation period. Furthermore, a number of messages received in consecutive periods of the activation period of operation required for the second radio device to be activated may vary dynamically based on a number of false activations comprising a period of activation without subsequent communication from the first radio device.

The activation period of operation of the second radio device may vary according to a predetermined programmable schedule. Also, the de-activation period of operation may continue irrespective of communication occurring at other proximately located remote devices. Furthermore, the first radio device may transmit a synchronization message to the second radio device on each frequency hopping spread spectrum (FHSS) channel, wherein the synchronization message may specify a frequency channel to be used for a next communication between the first radio device and the second radio device, wherein the first radio device may be tuned to the specified frequency channel following transmission of the synchronization message, wherein the second radio device may receive the synchronization message on any channel the second radio device is currently tuned to, and wherein the second radio device may tune to the specified next communication frequency channel.

Moreover, the second radio device may transmit a response to the received synchronization message to the first radio device using any of (i) a same technique of transmission on each FHSS channel as the first radio device uses for the synchronization message transmission, and (ii) the frequency channel specified in the synchronization message. Additionally, each message sent from the first radio device after the synchronization message to the second radio device may identify a specified different frequency channel to be used for the next communication between the first radio device and the second radio device, wherein the first radio device may be tuned to the specified new frequency following transmission of the synchronization message, wherein the second radio device may be tuned to the specified frequency channel following receipt of the synchronization message for any of transmission of a response message and reception of a next communication message between the first radio device and the second radio device.

Furthermore, each synchronization message may comprise information sufficient to determine how many synchronization messages remain in a burst of synchronization messages such that the second radio device determines, based on a number of messages remaining and a length of the synchronization message, when the transmission of the synchronization message on all FHSS channels by the first radio device will be complete and when the second radio device is permitted to send a response message without risk of coincidence with any of the synchronization messages.

Another embodiment provides a communications device comprising a microprocessor; a memory component operatively connected to the microprocessor; a timer operatively connected to the microprocessor; and a two-way radio component that periodically enters into an activation period of operation and a de-activation period of operation in order to conserve power, wherein the radio component receives an activation message, wherein the radio component increases a frequency of activation of the radio component upon receipt of a designated activation message, and wherein prior to receipt by the radio component, the activation message is repeatedly and continuously transmitted for a period at least equal to the sum of the activation period of operation and the de-activation period of operation of the radio component.

Additionally, at least one complete activation message may be received by the radio component during every period of time allotted for activation of the radio component. Furthermore, each transmission of the activation message may occur on each of a plurality of radio frequencies in a pseudo-random pattern such that with N frequencies used, at least (N+1) complete messages are transmitted in the time allotted for activation of the radio component. Also, the radio component may be periodically tuned to a different frequency. Moreover, the radio component may extend the activation period of operation upon receipt of the designated activation message, wherein the radio component may enter the de-activation period of operation if an additional designated activation message is not received within the extended activation period, and wherein the radio component may enter an active state of operation following N successive periods of receipt of designated messages and the extended activation period.

Additionally, a number of messages received in consecutive periods of the activation period of operation required for the radio component to be activated may vary dynamically based on a number of false activations comprising a period of activation without subsequent communication from a remotely-located radio transmitter. Also, the activation period of operation of the radio component may vary according to a predetermined programmable schedule. Furthermore, the de-activation period of operation may continue irrespective of activation and communication occurring at other proximately located communications devices.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a system and method for using radio signals to initiate communication with a remote device whose radio receiver is operating on a low duty cycle to conserve power. This allows for remote wireless communication with a limited-energy device while minimizing the energy the device consumes while listening for a wireless communication. Referring now to the drawings, and more particularly to FIGS. 1 through 9, where similar reference characters denote corresponding features consistently throughout the figures, there are shown preferred embodiments.

Figure 1:
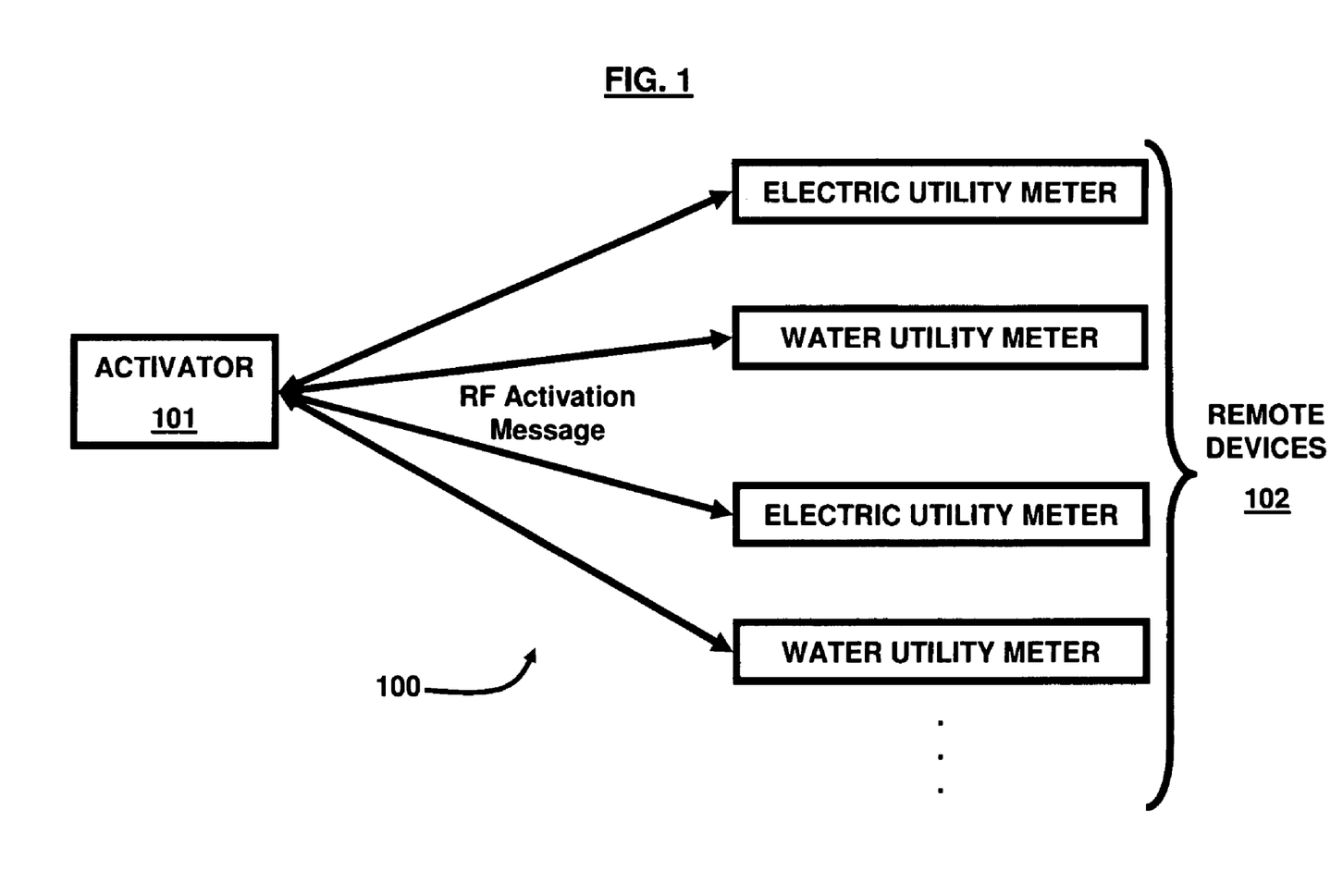
FIG. 1 illustrates a schematic diagram of a system according to an embodiment herein.
Figure 2:
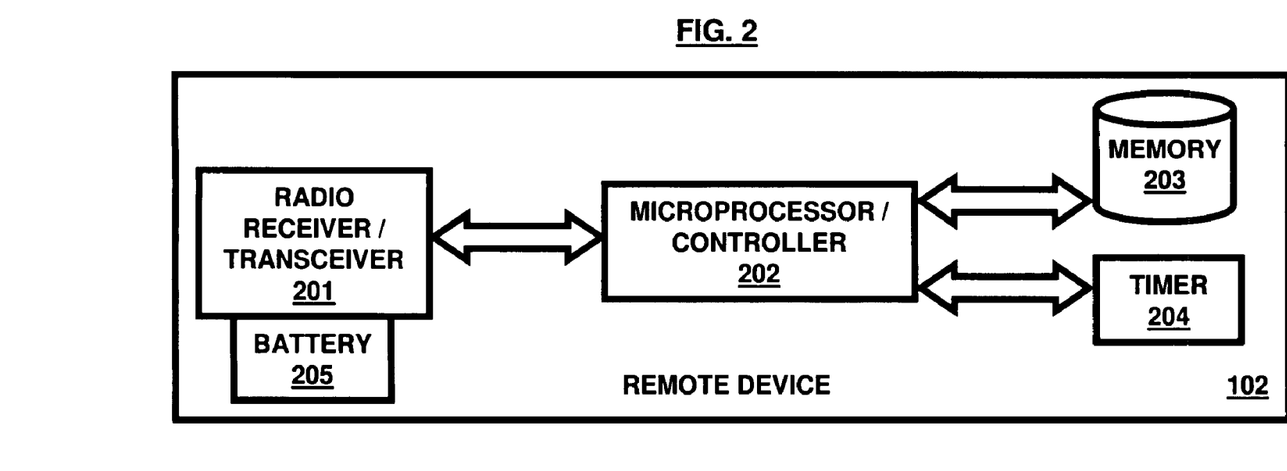
FIG. 2 illustrates a schematic diagram of a remote device according to an embodiment herein.

FIG. 1 illustrates a system 100 comprising an activator 101 that initiates communications with energy-limited remote devices (RDs) 102. Examples of systems containing the activator 101 and the set of RDs 102 include systems for remote sensor monitoring (telemetry), remote reading of utility meters, remote control of actuators such as valves and switches, monitoring of mailboxes, pipelines, traffic control systems, industrial lighting and control systems, irrigation control systems, structural sensors, security systems, home automation systems, etc. In many cases, such as the examples described above, remote activation and communication are infrequent and occur at times that cannot be precisely predicted. For example, the RDs 102 may be embodied as utility meters, as depicted in FIGS. 1 and 2, and are equipped with battery-powered radio transceivers 201 that may be interrogated for their reading using wireless RF communication at a distance.

Typically, a utility employee will visit the meter 102 monthly and request and record the current reading from the meter 102 for billing purposes. In order to receive a reading request, the radio receiver 201 (shown in FIG. 2) in the meter 102 must be operating; however, it is not practical to operate the radio receiver 201 continuously due to the power consumed by the radio receiver 201 and the limitations of the battery 205 and the required battery life. The precise date and time that the reading will be requested is hard to predict as it may vary based on employee availability, weather conditions, etc. The embodiments herein allow the radio receiver 201 in the utility meter 201 to be operated at a low duty cycle to conserve power while providing a method for the utility employee to remotely activate (increase the duty cycle) the meter 102 in order to communicate with it (e.g. to request the current meter reading or to control a valve or switch, etc.).

Figure 3:
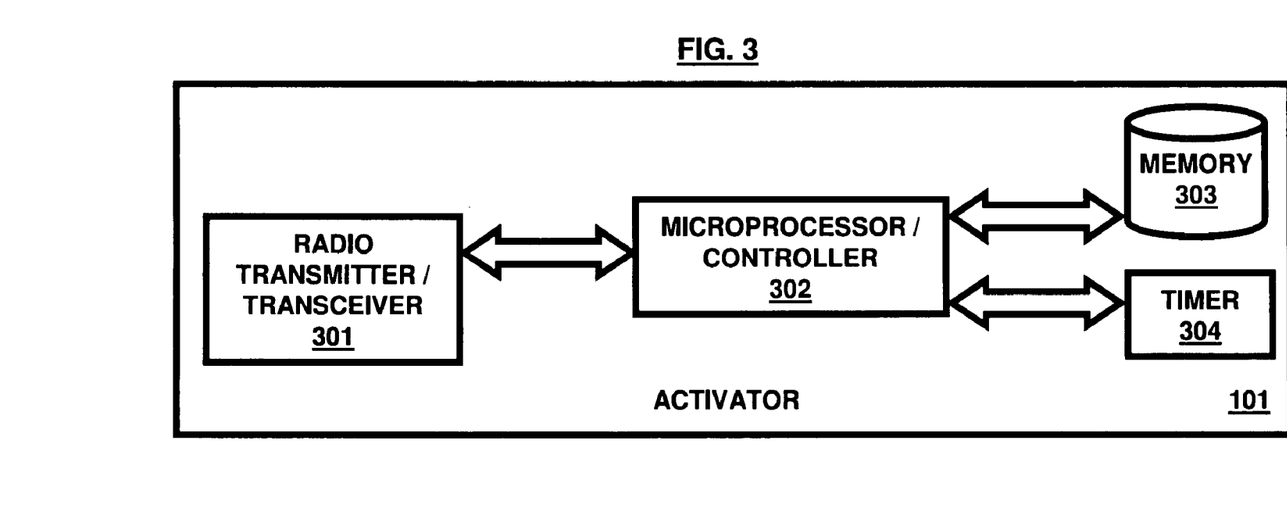
FIG. 3 illustrates a schematic diagram of an activator device according to an embodiment herein.

Accordingly, the embodiments herein provide a method for an electronic device (activator 101) to remotely activate and then communicate with one or a plurality of remote electronic devices (RDs 102) using wireless RF communication as shown in FIG. 1. For example, the RDs 102 may include one or more electric utility meters and/or one or more water utility meters. The system 100 comprises RDs 102, which are embodied as electronic devices that comprise a radio receiver or transceiver 201, a microprocessor/controller 202, memory 203, a clock or timer 204, and a battery 205 to power the radio receiver/transceiver 201 as indicated in FIG. 2. RDs 102 are power-limited devices that operate their radio receivers 201 intermittently to conserve power. When a properly formatted activation message (AM) is received from the activator 101, the RDs 102 operate their radio receivers 201 more frequently or continuously to facilitate subsequent radio communications. The system 100 further includes activator devices (ADs) 101, which are embodied as electronic devices that comprise a radio transmitter or transceiver 301, a microprocessor/controller 302, memory 303, and a clock or timer 304 as illustrated in FIG. 3. AD(s) 101, which typically are not power-limited, can transmit radio messages to one or more RDs 102. Typical messages include AMs which, when received by RDs 102, instruct the microprocessor/controller 202 of the RD 102 to operate their radio receivers 201 more frequently or continuously and monitoring and controlling messages used to communicate data and control signals between the activator 101 and RDs 102.

For example, an AM may comprise a specific sequence of digital bits such as 1011010011010100101110100. When RDs 102 activate their radio receivers 201, they monitor the received data for this specific bit sequence using hardware or software techniques programmed in memory 203 and processed by microprocessor/controller 202. When the sequence is received, an indication is provided to the RD microprocessor/controller 202; if the sequence is received R times within a given time window, it is assumed to have been sent by an activator device 101 and the microprocessor/controller 202 will alter the timing of activation of the radio receiver 201 to facilitate further communication.

Figure 4:
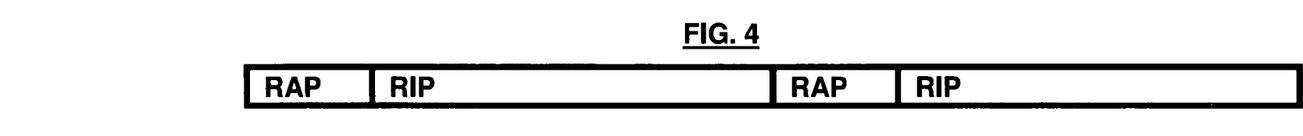
FIG. 4 illustrates a schematic diagram of a sequence of a receiver active period (RAP) followed by a receiver inactive period (RIP) according to an embodiment herein.

Activation of the RDs 102 occurs in the following manner. When RDs 102 are power-limited such as devices that operate on batteries 205, it is desirable to minimize power consumption while facilitating wireless communication when required. In most cases, radio frequency (RF) receivers 201 require substantial energy to operate; in order to conserve energy while facilitating radio communication, RDs 102 may operate their radio receivers 201 at a reduced duty cycle. If an RD 102 activates its radio receiver 201 for a relatively short period of time: receiver active period (RAP) followed by a period where the receiver 201 is turned off to conserve power: receiver inactive period (RIP), it will reduce the average power usage associated with the radio receiver 201 by a factor of (RIP+RAP)/RAP. For example, if a RD 102 operates its radio receiver 201 for 50 ms of each 5-second period, the power consumption associated with the radio receiver 201 is reduced by a factor of 100. The predetermined programmable selection of values for RAP and RIP balances power savings with initial communication latency (time required for initial message reception) as indicated in FIG. 4.

Figure 5:
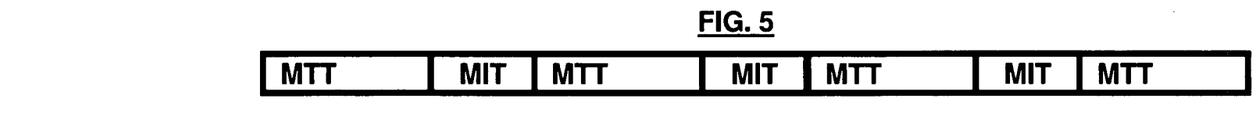
FIG. 5 illustrates a schematic diagram of a sequence of a repeated transmission of an activation message (AM) and the gap between each AM being transmitted according to an embodiment herein.

In order for an activator 101 to initiate communications with a RD 102, the activator 101 sends the RD 102 a wireless RF AM. The length of the AM and the rate at which information is transmitted determine a fixed message transmission time (MTT). When the activator 101 does not have a-priori knowledge of the RD receiver active period (RAP), the AM is transmitted repeatedly until the activator 101 can be certain it has been transmitted during the RAP. In many cases, radio hardware requires an interval between transmission of each message (message interval time=MIT). The repeated transmission of the AM and the gap between each AM being transmitted may be visualized as shown in FIG. 5. The AM transmission period (AMP) is the message transmission time (MTT) plus the interval between each transmission (MIT). Because the message transmission and receiver activation are not synchronized, in order to assure reception of the AM, the entire message (MTT) occurs during the RAP; therefore both MTT+MIT<RAP and MTT≦RAP/2.

Figure 6:
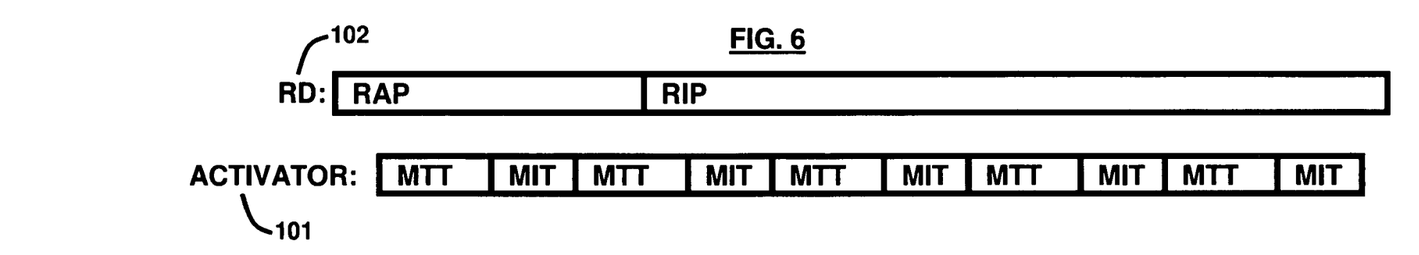
FIG. 6 illustrates a schematic diagram of remote device and activator device signal reception and transmission sequences according to an embodiment herein.

The AM is repeatedly transmitted for the period of RAP+RIP. This assures that the message is sent during the RAP. Using this method, if the radio receiver(s) 201 of the RDs 102 are tuned to the same frequency as the radio transmitter 301 of the activator 101, and if the devices (activator 101 and RDs 102) are within RF communications range, the RD 102 receives the AM. FIG. 6 further illustrates this concept.

Government regulatory agencies such as the United States Federal Communications Commission (FCC) commonly impose a requirement for RF transmitters above a certain RF power level to periodically vary their transmission frequency such that transmissions are spread evenly across a specified set of RF frequencies. The pattern of periodic variation is typically required to be pseudo-random. This technique is referred to in the art as frequency hopping spread spectrum (FHSS).

FHSS is also often used as a technique to avoid interference from other radios and to improve resistance to unauthorized reception. In order to communicate successfully, a transmitter 301 and a receiver 201 typically share knowledge of the set of RF frequencies to be used. For efficient extended communication, the transmitter 301 and receiver 201 also typically share knowledge of the sequence in which the RF frequencies will be used (hop pattern) and the timing of the changes in RF frequencies (hop timing).

FHSS complicates the method for wireless remote activation since prior to synchronization of hop pattern and hop timing, the transmitter 301 and receiver 201 may be tuned to different frequencies at the time of transmission of an initial AM (i.e., although the RAP and MTT may coincide in time, they may not coincide in frequency which would prevent communication).

The method for wireless remote activation may be modified to accommodate an FHSS system using N channels by requiring that the activator 101 transmit the AM in a burst on each of the N channels in a pseudo-random (PN) sequence within the RAP less one message period; i.e., ((N+1)*(MTT+MIT))≦RAP.

Figure 7:
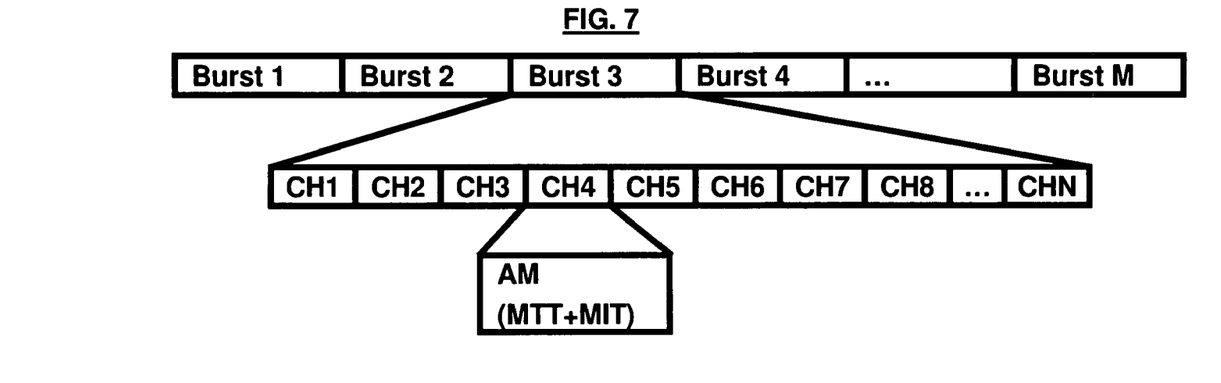
FIG. 7 illustrates a schematic diagram of a channel data burst sequence according to an embodiment herein.

In order to assure reception of the AM on the frequency channel on which the RD 102 has its radio receiver 201 tuned, the activator 101 transmits the AM (requires MTT+MIT time for each AM transmission) in continuous bursts on each of N channels as indicated in FIG. 7. The activator 101 sends M*N transmissions of the AM such that the total of M bursts takes RAP+RIP and such that each burst meets the requirements described above to assure that the AM is received by the RD 102 regardless of which of the N channels it is tuned to.

With respect to error tolerance, the length of the AM and the degree to which the message must be correct (the number of errors tolerated in the message) determines the frequency with which reception of random RF energy will incorrectly appear to be a valid AM transmitted by the activator 101. Longer messages and lower error tolerance reduce the likelihood of false message receptions. Shorter messages allow a shorter AMP and therefore shorter RAP which reduces energy consumption in the RDs 102. Higher error tolerances improve the RF communications range. Those skilled in the art will understand that effective methods balance error tolerance with energy consumed as a result of false activations.

The method may be enhanced to tolerate a higher frequency of false AM reception by requiring reception of multiple AMs within a given period. When an AM is received, the period of receiver activity (RAP) is extended for at least an additional RAP. If the AM that was received had been transmitted by an activator 101, additional AMs should be received in the extended RAP. If the message was received due to random noise, the probability of two or more such successive receptions is lower. Therefore the method may be enhanced to require R additional receptions of the AM within an extended RAP before the RD 102 enters the "active" state in which it increases the frequency of operation of its radio receiver 201 to facilitate further communication.

Following each reception of a valid AM, the RAP is extended until the requisite number of AMs has been received within an allotted time. Those skilled in the art will understand that the value of R, length of the AM, and the number of bit-errors tolerated in the received message while still being considered valid should be balanced for a particular embodiment to meet energy consumption requirements (more energy is consumed by false activations or longer RAPs).

For example, upon receipt of an AM, a RD 102 might temporarily extend its RAP expecting to receive another AM. If an additional AM is not received within the extended RAP, the first AM could be assumed to be an error and the receiver 201 is inactivated and the normal RAP/RIP duty cycle is resumed. Increasing the number of required additional AM receptions increases the error tolerance of the system 100. Those skilled in the art will understand that the number of errors tolerated in an individual AM can be balanced against the number of additional AMs required within a given window of time and the overall impact on energy usage.

The RF communication range and data rate (the rate at which information is communicated) are inversely related; i.e., faster data rates have a reduced communications range. Therefore, a balance should be struck between the communications range, FHSS requirements, energy used, and initial communication latency. The selection of data rate, RIP, and RAP determine these parameters and may be varied within the method as required for the specific embodiment.

When the availability of the RD 102 may be scheduled, power consumption may be further reduced by limiting the operation of the receiver 201 to only those periods when activation of the device 102 may be required. A schedule of radio receiver operation may be pre-programmed into the RDs 102 and may be changed via subsequent communication. In this embodiment, the RDs 102 will only activate their radio receivers 201 during scheduled days/times. For example, if the RD 102 will only be read on weekdays between 8 AM and 6 PM, radio receiver operation may be limited to those days/times. Those skilled in the art will understand that the schedules may take many forms and operate on a variety of criteria.

The embodiments herein use activators 101 to initiate communication with RDs 102 by sending a properly formatted RF AM and then subsequently monitoring and controlling the RDs 102 using other radio messages containing properly formatted messages. Monitoring and control are performed by sending messages from the activator 101 to the RD 102 requesting data which the RD 102 will send or sending data to the RD 102 for the RD 102 to act upon. The messages are typically structured to allow different message types with varying contents.

In one embodiment, the technique is used for a remote utility meter reading system 100. The system 100 is designed for periodic (typically monthly) retrieval of utility meter readings by a handheld or mobile activator 101. In this embodiment, the RDs 102 in the system 100 are embodied as utility meters or are separate devices interfaced with the utility meter. The activator 101 is used by a meter reader to activate the remote meters/interface devices which may then be asked to transmit their current meter readings and may allow other remote monitoring and control via radio communication.

This embodiment is designed for use in the United States in the 902 MHz-928 MHz ISM band, which is subject to the rules and regulations of the FCC. The system 100 uses RF transmissions of 1 mW or higher power (typically 200-250 mW) and accordingly use a spread-spectrum technique per FCC regulations. FHSS is used as described above with transmissions spread across 50 frequency channels. Those skilled in the art will understand that the embodiments herein can be used within other frequency bands and subject to other regulatory requirements.

The meter reading system 100 uses battery powered meters or meter interface units as RDs 102. Preferably, the RDs 102 have an extended battery life (years). Accordingly, a 65 ms per 5-second ratio of receiver activation to receiver inactivity is used to reduce battery consumption associated with receiver activation by a factor of approximately 77 while still allowing reasonable reading responsiveness. With 50 channels and an RAP of 65 ms, the Activation Message Period (AMP) (MTT+MIT) is preferably less than 1.27 ms (65 ms/51 channels). Assuming a 250 µs tuning time (MIT), the AM transmission time (MTT) is preferably no more than approximately 1 ms.

The radio receiver 201 used in the embodiments herein may use a fixed 24-bit message header to synchronize bit timing and allows a choice of 8, 16, 24, or 32-bit patterns to be used for the AM. The length (in bits) of the bit synchronization header and AM and the rate at which the data bits are transmitted determine the AMP. For example, with a 32-bit AM and a data rate of 76800 bits per second, the total transmission would require (24+32 bits)/76800 bps=730 µs. Shorter messages would require less time but would result in a higher incidence of incorrect detection of AMs due to random noise. For example, with an 8-bit AM, the effect of random noise on the RD radio receiver 201 would result in an AM being detected incorrectly on average every 256 bit periods in which the radio receiver 201 is active (at a 76800 bps data rate, an incorrect message would be received every 3-4 ms, which would have a significant negative impact on battery life). With a 32-bit AM with no errors tolerated, at 76800 bps, a message would be incorrectly detected on average approximately every 15.5 hours during which the receiver 201 is active. With a 50 ms every 5-seconds receiver activation duty cycle, this would equate to every 64-65 days, which would have a negligible effect on battery life.

The embodiments herein utilize a 24-bit AM with a data rate of 50780 bps which requires approximately (24+24 bits)/50780 bps=946 µs. Detection of the AM depends on matching a 24-bit pattern and 1 bit error will be tolerated anywhere in the pattern. The selections of the duty cycle, data rate, AM matching pattern length, and number of bit-errors tolerated determine the radio range, responsiveness, and energy consumed by the radio receiver 201 of the RDs 102. Those skilled in the art will understand that numerous similar tradeoffs are possible within the framework of the embodiments herein.

The selection of a 24-bit matching pattern, a 50780 bps data rate, and a 65 ms RAP allow random noise to cause a false match every 1 in 16777216 ($2^{24}$) bit periods or on average approximately once every 7 hours. Allowing 1 bit-error in the matching pattern increases the random match incidence to once every 17 minutes. This frequency of matching and subsequent increase in operation of the receiver 201 will exceed the energy usage requirements for the RD 102.

To reduce the incidence of unwanted activation, another method provided by the embodiments herein is used whereby the RAP is extended by another 65 ms each time an AM is received and an additional AM is required within the extended RAP for activation (increased frequency of receiver operation) to occur. The probability of a false reception match occurring in each 65 ms window is 1 in 203 and so the probability of two consecutive false matches is 1 in (203*203)=1 in 41209 which makes the average incidence of false activation less than once per day. When activated, the RD 102 remains active operating its radio receiver 201 continuously for 60 seconds in the absence of other communication from the activator 101 and so the energy consumption associated with false activations is minimized.

Energy consumption in the RDs 102 may be further reduced by scheduling the days and hours during which the RDs 102 activate their radio receivers 201. For example, the default schedule permits utility meter reading on Monday through Saturday from 6 AM to 8 PM. During non-scheduled hours, the RDs 102 do not operate their radio receivers 201 or operate them on a reduced duty cycle such as 65 ms per 5-minutes, thereby conserving power. The schedule may be changed via instructions provided through communications from the activator 101. Additionally, various powering techniques may be used to power the RDs 102, for example, using battery 205 or other powering techniques known in the art may be used.

When activated as a result of receiving the proper number of AMs within a given period, the RDs 102 operate their radio receivers 201 continuously for a configurable period which is typically 60 seconds. During this period, the activator 101 may send radio messages to the RD 102 to request data from the RD 102 or configure or control the RD 102. Following each communication received from the activator 101, the RD 102 extends the period during which the radio receiver 201 is continuously active for an additional configurable period. When the period expires with no additional messages received from the activator 101, RDs 102 deactivate their radios 201 and resume their normal low-duty cycle behavior. Activators 101 may also send a message to an RD 102 to command the RDs 102 to deactivate their radio receivers 201 for a configurable period of time; this is performed to prevent further un-intentional activations of the RD 102 while the activator 101 is sending AMs to other RDs 102 in the same vicinity.

Once activated and operating the radio receivers 201 continuously or at a substantially increased duty cycle, the activator 101 communicates with the RDs 102 using any one of a plurality of methods: (1) A message is transmitted in a data burst on all FHSS channels, typically in a pseudo-random (PN) sequence such that the RD 102 receives the message on whichever channel its radio receiver 201 is tuned to. If the message requires a response (e.g., a request for a utility meter reading), the RD 102 may respond using the same burst technique or on a frequency channel specified in the request message. (2) A synchronization message is sent from the activator 101 to the RDs 102 providing the information required to synchronize the devices (activator 101 and RD 102) with respect to hop pattern and hop timing. Typically, the synchronization message contains information sufficient to establish the PN hopping pattern (e.g. a unique identifier from which the pattern can be extrapolated or the pattern itself) and timing information that allows the two devices (activator 101 and RD 102) to synchronize their clock/timer hardware 204, 304 in order to determine and synchronize when the two devices (activator 101 and RD 102) will change frequencies. A method for extrapolating a hop pattern from a short unique identifier is described in U.S. Patent Application Publication Number US 2006/0239333, the complete disclosure of which, in its entirety, is herein incorporated by reference. (3) The method of (1) is used wherein (a) a synchronization message (SM) is sent on each FHSS channel from the activator 101 to the RD 102; the SM specifies at least the next frequency channel to be used for communication between the RD 102 and activator 101 and typically information allowing the RD 102 to address responses to the activator 101 and identify the pattern in which the FHSS channels are used by the activator 101; the SM may also carry additional information such as a command or request for the RD 102; and where the activator 101 tunes its radio receiver and transmitter 301 to the specified next frequency channel following completion of transmission of the synchronization message on each of the FHSS channels to receive a response from the RD 102 and/or send a subsequent message; and (b) where the RD 102 tunes its radio receiver and transmitter 201 to this specified frequency channel following receipt of the message on which specified channel it will send a response following completion of the SM and/or wait for the next message from the activator 101; and (c) where the activator 101 may send a subsequent message to the RD 102 on the specified frequency channel which message will specify a new response channel chosen by the activator 101 usually in a pseudo-random sequence from the FHSS channel set. Using this method, the activator 101 and RD 102 will remain synchronized in frequency repeating steps 3(b) and 3(c) as long as the RD 102 receives each message sent by AD 101; each communication moves to the next frequency channel in a typically PN sequence by the transmitter 201 specifying the channel to move to for the next communication in each transmission; if the activator 101 determines that a message has been missed (e.g., by failure of the RD 102 to respond within an allotted time), it re-synchronizes using method 3(a) above. If each message in the burst of messages sent by the transmitting activator device 101 forming a SM requires a response and includes information allowing a remote receiving device 102 to determine how messages remain in the burst (e.g. a sequence number), the remote receiving device 102 may determine when the activator device 101 has finished transmission of all SM messages based on the number of messages remaining and the length of each message so that the remote device 102 can send a response on the frequency channel specified in the SM following completion of all SM transmissions by the activator device 101 without risk of sending the response message before the activator 101 has finished transmitting the SMs.

Following successful monitoring and control of an RD 102 by the activator 101, which may include exchanging collected data, loading new software into the RD 102, controlling RD 102 functions, etc., the activator 101 may instruct the RD 102 to disable operation of its radio receiver 201 for a specified period of time in order to prevent further receipt of AMs and associated energy use while the activator 101 communicates with other RDs 102 (e.g., other RDs 102 located in the same general vicinity). The activator 101 will typically instruct the RD 102 to temporarily deactivate its radio 201 by sending a radio message to the RD 102 indicating that the RD 102 should suppress RAPs for a specified period.

Figure 8:
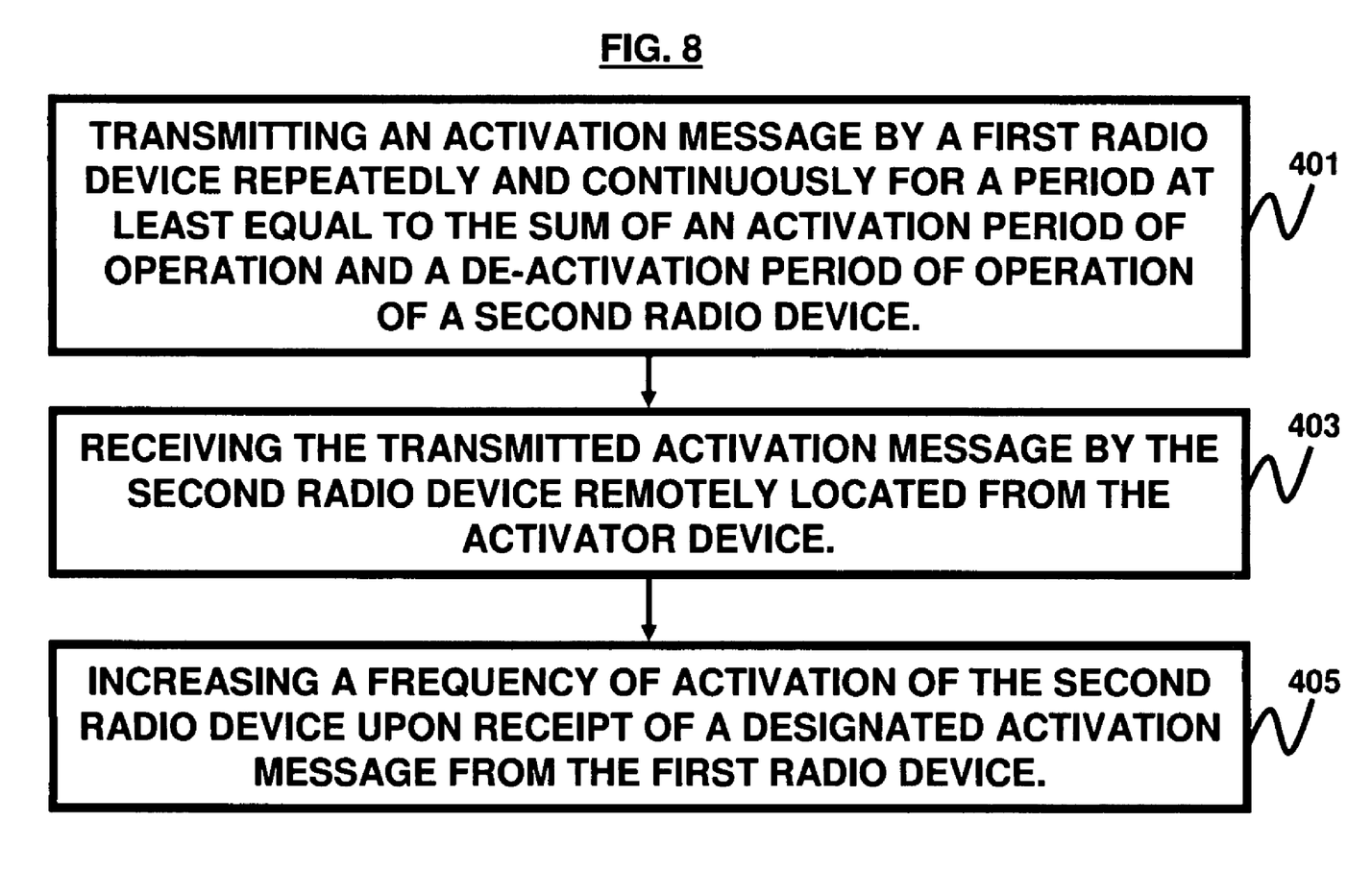
FIG. 8 is a flow diagram illustrating a preferred method according to an embodiment herein.

FIG. 8, with reference to FIGS. 1 through 7, illustrates a flow diagram illustrating a method of wireless communication in a system 100 comprising a first radio device 301 and a remotely located second radio device 201 according to an embodiment herein, wherein the method comprises transmitting (401) an AM by the first radio device 301 repeatedly and continuously for a period at least equal to the sum of an activation period of operation and a de-activation period of operation of the second radio device 201; receiving (403) the transmitted AM by the second radio device 201 remotely located from the activator device; and increasing (405) a frequency of activation of the second radio device 201 upon receipt of a designated AM from the first radio device 301, wherein at least one complete AM is transmitted during every period of time allotted for activation of the second radio device 201.

The method further comprises transmitting the AM on each of a plurality of radio frequencies in a pseudo-random pattern such that with N frequencies used, at least (N+1) complete messages are transmitted in the time allotted for activation of the second radio device 201. The method further comprises periodically tuning the radio to a different frequency. Additionally, the method further comprises the second radio device 201 extending the activation period of operation upon receipt of the designated AM, wherein the second radio device 201 enters the de-activation period of operation if an additional designated AM is not received within the extended activation period, and wherein the second radio device 201 enters an active state of operation following N successive periods of receipt of designated messages and the extended activation period.

The number of messages received in consecutive periods of the activation period of operation required for the second radio device 201 to be activated varies dynamically based on a number of false activations comprising a period of activation without subsequent communication from the first radio device 301. Additionally, the method further comprises varying the activation period of operation of the second radio device 201 according to a predetermined programmable schedule. Moreover, the method further comprises the second radio device 201 periodically entering into the activation period of operation and the de-activation period of operation in order to conserve power.

Next, the method further comprises maintaining the de-activation period of operation irrespective of activation and communication occurring at other proximately located remote devices 102. The first radio device 301 transmits a SM to the second radio device 201 on each FHSS channel, wherein the SM specifies a frequency channel to be used for the next communication between the first radio device 301 and the second radio device 201, wherein the first radio device 301 is tuned to the specified frequency channel following transmission of the SM, wherein the second radio device 201 receives the SM on any channel the second radio device 201 is currently tuned to, and wherein the second radio device 201 tunes to the specified next communication frequency channel.

In one embodiment, the second radio device 201 transmits a response to the received SM to the first radio device 301 using any of (i) a same technique of transmission on each FHSS channel as the first radio device 301 uses for the SM transmission, and (ii) the frequency channel specified in the SM. In one embodiment, each message sent from the first radio device 301 after the SM to the second radio device 201 identifies a specified next frequency channel to be used for the next communication between the first radio device 301 and the second radio device 201, wherein the first radio device 301 is tuned to the specified new frequency following transmission of the SM or transmission of each message after the SM, wherein the second radio device 201 is tuned to the specified frequency channel following receipt of the SM or receipt of each message after the SM for any of transmission of a response message and reception of the next communication message between the first radio device 301 and the second radio device 201.

Furthermore, each SM may comprise information sufficient to determine how many SMs remain in a burst of SMs such that the second radio device 201 determines, based on a number of messages remaining and a length of the SM, when the transmission of the SM on all FHSS channels by the first radio device 301 will be complete and when the second radio device 201 is permitted to send a response message without risk of coincidence with any of the SMs.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
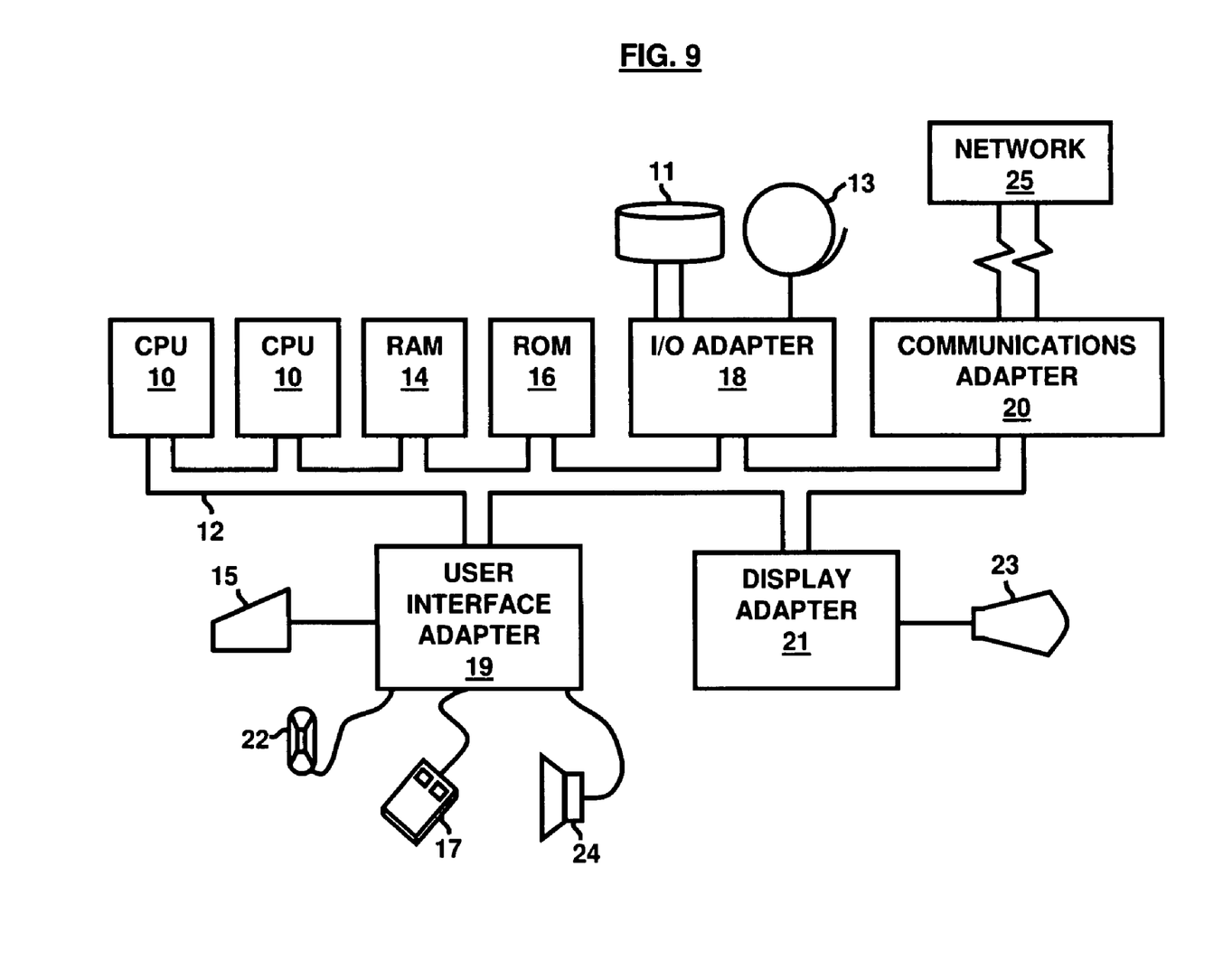
FIG. 9 illustrates a schematic diagram of a computer architecture used in accordance with the embodiments herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein offer a significant improvement over conventional solutions for remote device activation and communication in that it operates at a significantly greater range without the use of restricted RF bands, expensive equipment, or reduced battery life. Prior generation utility meter reading products transmitted the current meter reading periodically and at low power (because the meters and readers were not synchronized/frequency hopping); as a result, the range of communication was limited to typically a few tens of feet. Conversely, the embodiments herein with higher power transmissions synchronized/frequency hopping communications using the methods described above increase the range to several hundred feet or more; the two-way communications used in the embodiments herein greatly expanded the capabilities of the system 100 allowing the activator 101 to configure and query RDs 102 and exchange large files including upgrading remote device software and retrieving historical meter reading logs from the RDs 102.

Generally, the embodiments herein provide a technique for remote wireless device activation. A RD 102 comprising a radio receiver 201, microprocessor 202, memory 203, and clock/timer 204 is used for periodically activating and de-activating its radio receiver 201 in order to conserve power. The RD 102 increases the frequency of radio receiver activation (including continuous activation) upon receipt of an appropriate AM by the radio receiver 201. An activator 101 comprising a radio transmitter 301, microprocessor 302, memory 303, and clock/timer 304 is used for transmitting an AM repeatedly and continuously for a period at least equal to the sum of the RD receiver activation and de-activation periods, where at least one complete AM is transmitted during every period of time allotted for RD receiver activation.

The activator 101 transmits the AM on each of a plurality of radio frequencies in a pseudo-random pattern such that with N frequencies used, at least (N+1) complete messages are transmitted in the time allotted for RD receiver activation. The radio receiver 201 may be periodically tuned to a different frequency. Moreover, upon receipt of an appropriate message, the RD 102 extends its period of radio receiver 201 activation and if an additional appropriate message is not received within the extended period, the receiver 201 will be inactivated; following N successive periods of receipt of appropriate messages and extended receiver activation, the RD 102 enters an "active" state. The number of messages received in consecutive periods of receiver activation required for RD activation varies dynamically based on the number of false activations (activations with no subsequent communication). Furthermore, the receiver activation may be limited to a specific schedule.

The embodiments herein may be used in wireless devices with limited energy in star or point-to-point configurations. The synchronization methods provided herein facilitate long-range communication in environments that limit radio transmission power when not using spread spectrum communications. The activation methods facilitate initiating communication and synchronizing low-power devices with reasonable latency while using relatively minimal amounts of energy.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A communications system comprising:
    an activator device comprising:
        a first radio device that transmits an activation message;
        a first microprocessor operatively connected to said first radio device;
        a first memory component operatively connected to said microprocessor; and
        a first timer operatively connected to said microprocessor;

a remote device comprising:
  a second radio device that periodically enters into an activation period of operation and a de-activation period of operation in order to conserve power;
  a second microprocessor operatively connected to said second radio device;
  a second memory component operatively connected to said microprocessor; and
  a second timer operatively connected to said microprocessor,
  wherein said first radio device transmits said activation message repeatedly and continuously for a period at least equal to the sum of said activation period of operation and said de-activation period of operation of said second radio device,
  wherein at least one complete activation message is transmitted by said activator device during every period of time allotted for activation of said second radio device, and
  wherein said second radio device increases a frequency of activation of said second radio device upon receipt of a designated activation message from said first radio device.

2. The system of claim 1, wherein said activator device transmits said activation message on each of a plurality of radio frequencies in a pseudo-random pattern such that with N frequencies used, at least (N+1) complete messages are transmitted in said time allotted for activation of said second radio device.

3. The system of claim 2, wherein said second radio device is periodically tuned to a different frequency.

4. The system of claim 3, wherein said second radio device extends said activation period of operation upon receipt of said designated activation message, wherein said second radio device enters said de-activation period of operation if an additional designated activation message is not received within the extended activation period, and wherein said second radio device enters an active state of operation following N successive periods of receipt of designated messages and said extended activation period.

5. The system of claim 4, wherein a number of messages received in consecutive periods of said activation period of operation required for said second radio device to be activated varies dynamically based on a number of false activations comprising a period of activation without subsequent communication from said first radio device.

6. The system of claim 2, wherein said first radio device transmits a synchronization message to said second radio device on each frequency hopping spread spectrum (FHSS) channel, wherein said synchronization message specifies a frequency channel to be used for a next communication between said first radio device and said second radio device, wherein said first radio device is tuned to the specified frequency channel following transmission of said synchronization message, wherein said second radio device receives said synchronization message on any channel said second radio device is currently tuned to, and wherein said second radio device tunes to the specified next communication frequency channel.

7. The system of claim 6, wherein said second radio device transmits a response to the received synchronization message to said first radio device using any of (i) a same technique of transmission on each FHSS channel as said first radio device uses for said synchronization message transmission, and (ii) the frequency channel specified in said synchronization message.

8. The system of claim 6, wherein each message sent from said first radio device after said synchronization message to said second radio device identifies a specified different frequency channel to be used for the next communication between said first radio device and said second radio device, wherein said first radio device is tuned to said specified new frequency following transmission of said synchronization message, wherein said second radio device is tuned to said specified frequency channel following receipt of said synchronization message for any of transmission of a response message and reception of a next communication message between said first radio device and said second radio device.

9. The system of claim 6, wherein each said synchronization message comprises information sufficient to determine how many synchronization messages remain in a burst of synchronization messages such that said second radio device determines, based on a number of messages remaining and a length of said synchronization message, when the transmission of said synchronization message on all FHSS channels by said first radio device will be complete and when said second radio device is permitted to send a response message without risk of coincidence with any of the synchronization messages.

10. The system of claim 1, wherein said activation period of operation of said second radio device varies according to a predetermined programmable schedule.

11. The system of claim 1, wherein said de-activation period of operation continues irrespective of communication occurring at other proximately located remote devices.

12. A communications device comprising:
  a microprocessor;
  a memory component operatively connected to said microprocessor;
  a timer operatively connected to said microprocessor; and
  a two-way radio component that periodically enters into an activation period of operation and a de-activation period of operation in order to conserve power,
  wherein said radio component receives an activation message,
  wherein said radio component increases a frequency of activation of said radio component upon receipt of a designated activation message, and
  wherein prior to receipt by said radio component, said activation message is repeatedly and continuously transmitted for a period at least equal to the sum of said activation period of operation and said de-activation period of operation of said radio component.

13. The communications device of claim 12, wherein at least one complete activation message is received by said radio component during every period of time allotted for activation of said radio component.

14. The communications device of claim 13, wherein transmission of said activation message occurs on each of a plurality of radio frequencies in a pseudo-random pattern such that with N frequencies used, at least (N+1) complete messages are transmitted in said time allotted for activation of said radio component.

15. The communications device of claim 14, wherein said radio component is periodically tuned to a different frequency.

16. The communications device of claim 15, wherein said radio component extends said activation period of operation upon receipt of said designated activation message, wherein said radio component enters said de-activation period of operation if an additional designated activation message is not received within the extended activation period, and wherein said radio component enters an active state of operation following N successive periods of receipt of designated messages and said extended activation period.

17. The communications device of claim 16, wherein a number of messages received in consecutive periods of said activation period of operation required for said radio component to be activated varies dynamically based on a number of false activations comprising a period of activation without subsequent communication from a remotely-located radio transmitter.

18. The communications device of claim 12, wherein said activation period of operation of said radio component varies according to a predetermined programmable schedule.

19. The communications device of claim 12, wherein said de-activation period of operation continues irrespective of activation and communication occurring at other proximately located communications devices.

20. A method of wireless communication in a system comprising a first radio device and a remotely located second radio device, said method comprising:
  transmitting an activation message by said first radio device repeatedly and continuously for a period at least equal to the sum of an activation period of operation and a de-activation period of operation of said second radio device;
  receiving the transmitted activation message by said second radio device remotely located from said activator device; and
  increasing a frequency of activation of said second radio device upon receipt of a designated activation message from said first radio device,
  wherein at least one complete activation message is transmitted during every period of time allotted for activation of said second radio device.

21. The method of claim 20, further comprising transmitting said activation message on each of a plurality of radio frequencies in a pseudo-random pattern such that with N frequencies used, at least (N+1) complete messages are transmitted in said time allotted for activation of said second radio device.

22. The method of claim 21, further comprising periodically tuning said radio to a different frequency.

23. The method of claim 22, further comprising said second radio device extending said activation period of operation upon receipt of said designated activation message, wherein said second radio device enters said de-activation period of operation if an additional designated activation message is not received within the extended activation period, and wherein said second radio device enters an active state of operation following N successive periods of receipt of designated messages and said extended activation period.

24. The method of claim 23, wherein a number of messages received in consecutive periods of said activation period of operation required for said second radio device to be activated varies dynamically based on a number of false activations comprising a period of activation without subsequent communication from said first radio device.

25. The method of claim 21, wherein said first radio device transmits a synchronization message to said second radio device on each frequency hopping spread spectrum (FHSS) channel, wherein said synchronization message specifies a frequency channel to be used for a next communication between said first radio device and said second radio device, wherein said first radio device is tuned to the specified frequency channel following transmission of said synchronization message, wherein said second radio device receives said synchronization message on any channel said second radio device is currently tuned to, and wherein said second radio device tunes to the specified next communication frequency channel.

26. The method of claim 25, wherein said second radio device transmits a response to the received synchronization message to said first radio device using any of (i) a same technique of transmission on each FHSS channel as said first radio device uses for said synchronization message transmission, and (ii) the frequency channel specified in said synchronization message.

27. The method of claim 25, wherein each message sent from said first radio device after said synchronization message to said second radio device identifies a specified different frequency channel to be used for the next communication between said first radio device and said second radio device, wherein said first radio device is tuned to said specified new frequency following transmission of said synchronization message, wherein said second radio device is tuned to said specified frequency channel following receipt of said synchronization message for any of transmission of a response message and reception of a next communication message between said first radio device and said second radio device.

28. The method of claim 25, wherein each said synchronization message comprises information sufficient to determine how many synchronization messages remain in a burst of synchronization messages such that said second radio device determines, based on a number of messages remaining and a length of said synchronization message, when the transmission of said synchronization message on all FHSS channels by said first radio device will be complete and when said second radio device is permitted to send a response message without risk of coincidence with any of the synchronization messages.

29. The method of claim 20, further comprising varying said activation period of operation of said second radio device according to a predetermined programmable schedule.

30. The method of claim 20, further comprising said second radio device periodically entering into said activation period of operation and said de-activation period of operation in order to conserve power.

31. The method of claim 20, further comprising maintaining said de-activation period of operation irrespective of activation and communication occurring at other proximately located remote devices.

* * * * *